Patented Sept. 14, 1954

UNITED STATES PATENT OFFICE 2,689,261

PRODUCTION OF FUNCTIONAL DERIVATIVES OF CARBOXYLIC ACIDS USING AMINE HEAVY METAL COMPLEXES OF METAL CARBONYL HYDRIDES

Walter Reppe, Ludwigshafen (Rhine), Germany, assignor to Badische Anilin- & Soda-Fabrik Aktiengesellschaft, Ludwigshafen (Rhine), Germany No Drawing. Application April 16, 1952, Serial No. 282,686

Claims priority, application Germany April 20, 1951

12 Claims. (Cl. 260—497)

The present invention relates to the production of functional derivatives of carboxylic acids, and in particular to the production of carboxylic acid esters, thioesters, amides or anhydrides.

It is known that functional derivatives of carboxylic acids may be prepared by adding to the double linkage of olefinic compounds simultaneously carbon monoxide and a compound containing a replaceable hydrogen atom, e. g. ammonia or primary or secondary amino compounds, alcohols or mercaptans or carboxylic acids. This type of reaction has been defined in recent years as "carbonylation." It is also generally known that such carbonylations may be performed with fairly good results by using as catalysts metal carbonyls or such metal compounds as are capable of being converted into metal carbonyls (see Walter Reppe, "Neue Entwicklungen auf dem Gebiet der Chemie des Acetylens und Kohlenoxyds," Springer-Verlag, 1949).

I have now found, and this constitutes the object of my invention, that carbonylations of the type referred to above may be carried out in an improved way by using as catalysts the complex metal salts of metal carbonyl hydrides. In using these compounds a principally new type of catalyst is introduced into this art. Whereas the conventional carbonylation catalysts are more or less quickly converted into metal carbonyls in the course of the carbonylation, and these metal carbonyls are carried away from the reaction zone by the product formed, the catalysts which are used in the present invention fulfil all the tasks to be expected from a metal carbonyl without, however, being irreversibly converted into such carbonyls.

The catalysts used in my invention contain preferably as cations in addition to the heavy metal, such as cadmium, zinc, copper or a metal of the iron group, basic nitrogen compounds, in particular ammonium or amines, which contain besides the amino group only carbon and hydrogen. To cite a few examples of such cations, I mention [Fe(NH$_3$)$_6$]$^{++}$, [Fe(NH$_3$)$_6$]$^{+++}$,

[Co(NH$_3$)$_6$]$^{++}$, [Ni(NH$_3$)$_6$]$^{++}$

[Co(NH$_2$CH$_2$CH$_2$NH$_2$)$_3$]$^{++}$

[Cd(NH$_3$)$_2$]$^{++}$ or analogous cations, wherein the NH$_3$ is replaced partly or totally by other organic amino compounds, or wherein the metals described are replaced by other heavy metals capable of forming complex cations. The anions of my catalysts are derived from metal carbonyl hydrides which are in fact relatively strong acids.

The preferred metal carbonyl hydride I use in my invention is cobalt carbonyl hydride $$HCo(CO)_4$$

The production of the catalysts used in my invention may be performed according to conventional methods. The cobalt carbonyl hydride may be manufactured according to the so-called base reaction by introducing the metal carbonyl into an aqueous solution of an alkali or alkali earth metal hydroxide or an amino compound. There is formed the corresponding salt of the metal carbonyl hydride which now may be caused to react with a complex heavy metal salt as they are obtainable by adding an excess of ammonia to a solution of an ordinary heavy metal salt derived from a mineral or organic acid.

A specific method of preparing the catalysts consists in treating with carbon monoxide aqueous solutions or suspensions of salts, oxides or hydroxides of metals capable of being converted into metal carbonyl hydrides in the presence of aqueous ammonia or amines at 50° to 250° C., preferably at 100° to 200° C., and at a pressure of at least 30 atmospheres, preferably 150 to 200 atmospheres. To the reaction product thus obtained I add a solution of a complex heavy metal salt which then by double conversion forms the complex metal salt of the metal carbonyl hydride. The amount of ammonia or amino compound should at least be sufficient to combine with the anion of the metal salt and to replace the hydrogen atoms of the metal carbonyl hydride. When the formation of the ammonium or amino salt of the metal carbonyl hydride is finished, I add the solution of the complex metal salt or, when the amount of ammonia or amine in the first solution is sufficient, the solution of a simple metal salt capable of forming a complex compound thereby performing the precipitation of the catalyst. In all these steps air should be excluded because the catalysts are easily decomposed by the action of oxygen.

The catalysts produced according to these methods are, as a rule, difficultly soluble or unsoluble in water. They may be separated from the reaction solution by physical methods, such as decanting, filtration, centrifugation and similar methods. They may be purified by washing, preferably with an aqueous solution of ammonia or an amine, and dried under reduced pressure. I recommend to carry out all these opeations by excluding air because the salts are sensitive to oxidation.

It is also possible to produce the catalysts in situ which means that I charge the reaction vessel to be used in the carbonylation with the ingredients necessary for forming the catalyst and producing it within the reaction vessel.

The starting materials for my invention are those conventionally used in carbonylations. In the first place I may use monoolefinic hydrocarbons, such as ethylene and its homologues, cyclohexene or its homologues and other hydroaromatic hydrocarbons, styrene and other arylolefins, or mixtures of such olefins, and also mixtures of olefinic hydrocarbons with paraffins of the same or different carbon number. I may apply my invention also to olefinic compounds containing in addition to carbon and hydrogen other atoms or atomic groups, for example unsaturated alcohols, like croton, allyl, or oleyl alcohol, unsaturated ethers, as for example vinyl alkyl ethers, 1-butenyl alkyl ethers, and analogous ethers derived from cycloaliphatic hydroxy compounds, unsaturated esters, such as acrylic and methacrylic esters, or the esters of saturated carboxylic esters and unsaturated alcohols. I may use also unsaturated acids themselves, preferably in the form of their salts, or unsaturated amines. The compounds having a replaceable hydrogen atom are also generally known (see Walter Reppe, loc. cit., page 105, where they are listed in groups).

The reaction runs smoothly and successfully with the aid of my catalysts at temperatures between 80° and 180° C. These are temperatures which are much lower than those required by the catalysts hitherto used. It is selfunderstood that I may carry out my invention at temperatures exceeding 180° C. with equal success. In that case I still have an advantage over the conventional catalysts because I may regain the unchanged catalyst from the reaction solution and use it again. Temperatures exceeding 250° C. are, as a rule, not necessary.

The pressure I propose to use should be at least 50 atmospheres. Even at that pressure the reaction can be carried out with the rate of conversion sufficient for technical operations. I prefer, however, to use pressures between 50 and 350 atmospheres in order to accelerate the conversion and I generally work at pressures between 100 and 300 atmospheres. I may use higher pressures than 300 atmospheres if the necessary equipment is available.

I may carry out the reaction discontinuously in the conventional high pressure autoclaves, lined with suitable material. I may also carry out the reaction in a continuous manner according to the various methods known in the art. In both cases I may apply the catalysts in dissolved or suspended state or rigidly arranged.

In a continuous operation I may allow the reaction liquid to flow downwards through a vertical high pressure vessel which is charged with a catalyst or filler bodies or similar installations so that the liquid trickles over the catalyst or the filler bodies while the gas is led in direct or counter current to the liquid. I may also lead the liquid through such a vessel upwards together with the gas and provide the catalyst in a dissolved or solid state so that it is continuously led through the reaction zone together with the starting materials. The carbon monoxide and the olefin, provided the latter is in vapor form, may be used as circulating gas.

Suitable solvents for the process are for example inert organic liquids, such as saturated aliphatic or aromatic hydrocarbons. I may use also solvents which are capable of reacting with olefins and carbon monoxide, provided they are used in excess or in combination with the starting material which is more reactive than the solvents. I may also use mixtures of different types of starting materials, for example alcoholic solutions of basic nitrogen compounds containing at least one free hydrogen atom attached to the nitrogen atom. The use of water as a solvent should be avoided substantially.

While the reaction products to be produced are functional derivatives of carboxylic acids, it is possible that other compounds are formed as by-products, such as esters of keto carboxylic acids, ketones, acetals and the like. The following examples will further illustrate how my invention may be carried out. The invention is, however, not restricted to these examples since the starting materials used therein are merely representing various types of compounds to be carbonylated.

*Example 1*

A movable autoclave of 250 cubic centimeters content made from stainless steel is charged, while cooling with Dry Ice, with 50 grams of 99 per cent methanol. 10 grams of liquid anhydrous ammonia and 4 grams of the cobalto hexammine salt of cobalt carbonyl hydride

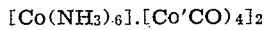
[Co(NH₃)₆].[Co'(CO)₄]₂

The whole operation is carried out under nitrogen. The autoclave is then put under a pressure of 100 atmospheres by charging a mixture of equal parts by volume of ethylene and carbon monoxide. The whole is then heated to 180° C. while shaking. The pressure rises to from 180 to 200 atmospheres, and it is maintained at that pressure by continuously replenishing the gas mixture until gas is no longer absorbed. In the course of 61 hours a total of about 700 atmospheres of the gas mixture is taken up by the reaction liquid.

After allowing to cool down and releasing the pressure, the reaction product is distilled. After a foreshot, boiling at 78° to 100° C. and consisting of unused methanol, about 52 grams of propinonic acid ethyl ester and 4.7 grams of diethyl ketone, 39 grams of a fraction, consisting of propionic acid amide, are obtained (B. P. $_{0.4}$=84° to 85° C., M. P.=77° to 78° C.). The distillation residue consists of the catalyst which may be dissolved in ethanol and used for another batch.

The catalyst used in the preceding example may be prepared in the following way: A platinum lined revolving autoclave of 1 liter is charged with 96 grams of cobalt chloride (CoCl₂.6H₂O) and 300 cubic centimeters of concentrated aqueous ammonia and then put under a pressure of 200 atmospheres of carbon monoxide at 180° C. for 24 hours. The mixture thus obtained contains the ammonium salt of cobalt carbonyl hydride. It is pressed over with nitrogen into a precipitating vessel and admixed with a solution of hexammino cobalto chloride, containing a solution of 48 grams of cobalto chloride in 80 cubic centimeters of water and 300 cubic centimeters of concentrated aqueous ammonia. The complex salt precipitated is filtered off by suction under a nitrogen atmosphere and then washed first with concentrated and later with dilute aqueous ammonia. After drying the product under subatmospheric pressure, about 70 grams of a salt of the composition

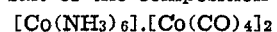
[Co(NH₃)₆].[Co(CO)₄]₂ is obtained.

Instead of the cobalto hexammino salt the complex amino cadmium salt may be used. This is obtained by adding to the solution of the ammonium salt of cobalt carbonyl hydride a solution of 20 parts of cadmium acetate in 100 parts of water and 45 parts of a 33 per cent aqueous acetic acid and later 30 parts of concentrated aqueous ammonia. This salt is colorless.

A similar catalyst may be prepared by dissolving 10 grams of cobalto chloride in 30 parts of water and 30 parts of a 33 per cent aqueous trimethylamine solution, treating this at 180° C. with carbon monoxide under 200 atmospheres and adding to the solution thus obtained a solution of 15 parts of cadmium sulfate and 85 parts of water. The precipitate formed has the formula: $[Cd[(CH_3)_3N]_2].[Co(CO)_4]_2$.

*Example 2*

A mixture of 22 grams of octylene, 50 grams of 99 per cent ethanol and 10 grams of anhydrous ammonia are treated in the presence of one of the catalysts described in Example 1 with carbon monoxide under 180 to 200 atmospheres at 185° C. while maintaining that pressure by constantly replenishing the carbon monoxide used up. In 6 hours a total of 65 atmospheres is taken up. After cooling and releasing the pressure, the reaction liquid is filtered off and the filtrate distilled, thereby removing unused ethanol and ammonia. The crystals formed in the residue (about 10 grams) are recrystallized. They constitute pure octyl carboxylic acid amide (M. P.=92° to 94° C.)

*Example 3*

Into an autoclave as described in Example 1 a mixture of 50 grams of methanol and 11 grams of the ferrous hexammine salt of cobalt carbonyl hydride is charged under nitrogen. A mixture of equal parts by volume of ethylene and carbon monoxide is pressed into the autoclave under 100 atmospheres and the whole is heated while shaking to 145° C. The pressure, increased to 200 atmospheres, is maintained by replenishing the gas mixture. A total of almost 1000 atmospheres thereof is taken up in the course of 19 hours. After cooling and releasing the pressure, the reaction product is distilled. Besides unchanged methanol 78 grams of methyl propionate and 24.3 grams of diethyl ketone are obtained. From the distillation residue the catalyst may be recovered by stirring with ether, filtering off by suction and washing with ether.

The catalyst may be prepared in the following manner:: A solution of 25 parts of cobalt chloride in 70 parts of water and 80 parts of concentrated aqueous ammonia is treated with carbon monoxide at 180° C. under 200 atmospheres. To the ammonium salt of cobalt carbonyl hydride thus obtained another 70 parts of concentrated aqueous ammonia are added together with a solution of 15 parts of Mohr's salt in 75 parts of water. The precipitate formed is filtered off and dried. It forms a crystalline green compound of the formula $[Fe(NH_3)_6][Co(CO)_4]_2$.

A catalyst of similar activity is obtained by adding to the solution of the ammonium salt of cobalt carbonyl hydride, described in the preceding paragraph, a solution of 15 parts of Mohr's salt and 30 parts of ethylene diamine in 100 parts of water. The crystalline yellow compound thus obtained corresponds to the formula

$[Fe(NH_2.CH_2.CH_2NH_2)_3][Co(CO)_4]_2$

Another catalyst which may be used instead of the two above described catalysts may be obtained by adding 15 parts of ferrous sulfate in 100 parts of water to the solution of the ammonium salt of cobalt carbonyl hydride as described above and a solution of 30 parts of hexamethylene diamine in 70 parts of water. The colorless compound thus obtained is sensitive to light and oxygen. It corresponds to the formula $[Fe(NH_2.(CH_2)_6NH_2)_3][Co(CO)_4]_2$ When adding to the solution of the ammonium salt of cobalt carbonyl hydride a solution of 30 parts of pyridine in 15 parts of water and a solution of 12 parts of Mohr's salt in 100 parts of water, a yellowish green pyridine iron complex salt of cobalt carbonyl hydride is obtained. This may be also used instead of the catalyst described above.

I claim:

1. In a process for the production of functional derivatives of carboxylic acids by the reaction of monoolefinic compounds with carbon monoxide and a hydrogen containing compound selected from the group consisting of alcohols, carboxylic acids, ammonia, primary and secondary amino compounds at elevated temperature and under superatmospheric pressure, the improvement which comprises using as a catalyst a salt of cobalt carbonyl hydride which contains as the cation a basic nitrogen complex of a metal selected from the group consisting of iron, nickel, cobalt, cadmium, zinc and copper.

2. A process as set forth in claim 1, wherein the complex cation of the catalyst is derived from said metal atom and ammonia.

3. A process as set forth in claim 1, wherein the complex cation of the catalyst is derived from said metal atom and a primary amine.

4. In a process for the production of functional derivatives of carboxylic acids by the reaction of a monoolefinic aliphatic hydrocarbon with carbon monoxide and a hydrogen containing compound selected from the group consisting of alcohols, carboxylic acids, ammonia, primary and secondary amino compounds at elevated temperature and under superatmospheric pressure, the improvement which comprises using as a catalyst a salt of cobalt carbonyl hydride which contains as the cation a basic nitrogen complex of a metal selected from the group consisting of iron, nickel, cobalt, cadmium, zinc and copper.

5. A process as set forth in claim 4, wherein the cation of the catalyst is derived from cobalt and a basic nitrogen compound.

6. A process as set forth in claim 4, wherein the cation of the catalyst is derived from cobalt and ammonia.

7. A process as set forth in claim 4, wherein the cation of the catalyst is derived from cobalt and a primary amine.

8. The process for the production of aliphatic carboxylic acid alkyl esters which comprises treating at temperatures between 80° and 250° C. under pressures exceeding 50 atmospheres a mixture of a monoolefinic aliphatic hydrocarbon and a saturated aliphatic alcohol with carbon monoxide in the presence of a salt of cobalt carbonyl hydride which contains as the cation a basic nitrogen complex of a metal selected from the group consisting of iron, nickel, cobalt, cadmium, zinc and copper as a catalyst.

9. The process as set forth in claim 8, wherein the complex cation of the catalyst is derived from a metal having an atomic weight between 55 and 59 and a basic nitrogen compound.

10. The process for the production of aliphatic carboxylic acid amides which comprises treating at temperatures between 80° and 250° C. under pressures exceeding 50 atmospheres a mixture of a monoolefinic aliphatic hydrocarbon and ammonia with carbon monoxide in the presence of a salt of cobalt carbonyl hydride which contains as the cation an ammine complex of a metal selected from the group consisting of iron, nickel, cobalt, cadmium, zinc and copper as a catalyst.

11. The process as claimed in claim 10, wherein the metal forming part of the cation of the catalyst has an atomic weight between 55 and 59.

12. The process as claimed in claim 10, wherein the cobalt hexammine salt of cobalt carbonyl hydride is used as a catalyst.

References Cited in the file of this patent

UNITED STATES PATENTS

| Number | Name | Date |
|---|---|---|
| 2,542,767 | Gresham | Feb. 20, 1951 |

OTHER REFERENCES

Reppe: Acetylene Chemistry, P. B. Report 18852-S, Meyer and Co., pages 158-159.